Oct. 21, 1969     P. DEXTER     3,473,334

APPARATUS AND METHOD FOR PRODUCING WAVES

Filed June 24, 1968     4 Sheets-Sheet 1

INVENTOR
PHILLIP DEXTER
BY George A. Mentis
ATTORNEY

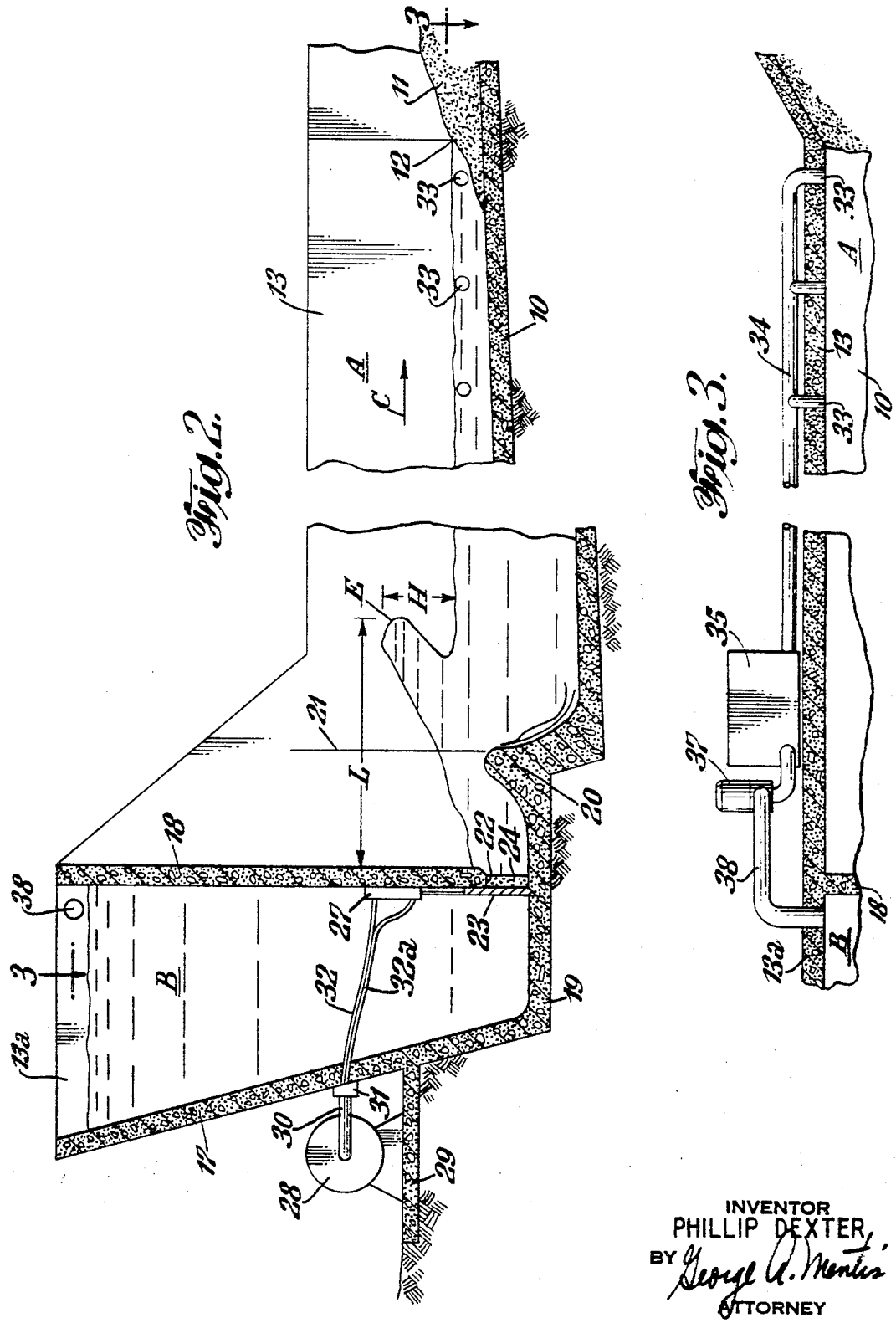

INVENTOR
PHILLIP DEXTER
BY George A. Mentis
ATTORNEY

3,473,334
APPARATUS AND METHOD FOR PRODUCING WAVES
Phillip Dexter, 3533 W. Hazelwood,
Phoenix, Ariz. 85019
Continuation-in-part of application Ser. No. 599,758,
Dec. 7, 1966. This application June 24, 1968, Ser.
No. 739,409
Int. Cl. E02b 3/00, 9/02
U.S. Cl. 61—1                                                            30 Claims

ABSTRACT OF THE DISCLOSURE

Apparatus and a method for producing translatory waves suitable for surfing including storing water in a reservoir to produce a predetermined head and subsequently releasing the water from beneath the surface of a body of water in the surfing area and for directing the water upward toward the surface, preferably by releasing the water against a deflector. The apparatus may be used in conjunction with natural or artificial bodies of water and provision is made for the removal of water from the surfing area at a point remote from the point of wave generation wherein interfering echo waves and the like are prevented from developing, at a rate substantially equal to the average rate of addition of water from the reservoir.

---

This application is a continuation-in-part of application Ser. No. 599,758, filed Dec. 7, 1966, now abandoned.

This invention relates to an apparatus useful for creating waves suitable for surfing. More particularly this invention concerns a specially constructed swimming pool or surfing tank having means for creating specific wave formations upon the body of water in the pool.

In a further aspect, the invention relates to an improved swimming pool structure having an attached wave-producing portion which utilizes the potential energy of a raised portion of the body of water to provide the motive force for the creation of translatory surface waves, suitable for surfing. In yet another aspect, the invention concerns a swimming pool of the character above described having means for the control of the frequency and amplitude of the wave, and furthermore for the prevention and control of shore created echo waves which would interfere with the effective creation and duration of the surfing waves.

In another aspect, the present invention relates to an improved method of producing waves which is adapted for the recirculation of water to provide an effective and efficient measure against water pollution.

Much leisure enjoyment and recreational activity is dependent upon the natural wave action of the ocean. Exemplary of such activities is the highly popular sport of surfing. Surfing enthusiasts living along coastal areas may indulge in their chosen recreational activity with considerable frequency, being limited only by the availability of their leasure time and favorable ocean conditions. Understandably, many persons living inland also enjoy the sport of surfing but are greatly handicapped by their geographic location. However, a significant number of such persons expend considerable amounts of monies and time for periodic trips to coastal areas. Further, many persons who would otherwise become advocates of the sport of surfing are reluctant to learn by venturing the necessary distance from the ocean shore.

Devices and methods have been designed and described in the prior art for production of waves upon artificial bodies of water. These devices are usually testing tanks for small scale ship models. Some do indeed relate to pool-like affairs having means at one end for generating simulated ocean waves. Particular devices incorporating a pool for the production of waves upon the body of water are described in such patents as Herz, U.S. 2,056,855, Wharton, 586,718, and more recently, Matrai, U.S. 3,005,207. These prior art devices and systems provide surface agitation, and in some instances may even provide oscillatory waves. However, such surface conditions will not provide a means for surfing. Specifically, a wave suitable for surfing must be at least translatory, and preferably a solitary or singular translatory wave of the spilling breaker type. The prior art is incapable of producing such a wave.

It is therefore an object of the present invention to provide a means for producing surfing waves.

Another object of the invention is the provision of an improved surfing tank by which the frequency and the amplitude of the wave can be controlled with increased convenience.

Another object of the invention is the provision of a unique and improved wave-making apparatus adapted for the creation of solitary translatory waves of the spilling breaker type suitable for surfing.

A still further object of the invention is the provision of an improved surfing tank and a method of producing surface waves having a minimum of operational components which is relatively inexpensive to construct and maintain.

Another object of the invention is the provision of an improved wave-making apparatus which is adapted for use as a control measure against water pollution.

These and other advantages of the invention will become apparent to those skilled in the art as the description thereof proceeds.

The prior art devices of the general type described in the Herz patent comprise a swimming pool area having an air-tight chamber contained within one end wall thereof. An elongate opening extending laterally below the normal quiescent level of the water communicates between the main swimming pool and the chamber. A conduit extending upwardly and rearwardly from the chamber communicates between the chamber and a pump. The pump is first rotated in one direction to exhaust air from the chamber and raise the level of the water to a distance above the normal quiescent level of the body of water in the pool. Thereafter, the rotation of the pump is reversed and the chamber is pressurized, forceably lowering the water level within the chamber, expelling water through the aforementioned opening wherein the expelled water is deflected only partially toward the surface. Wharton attempts to produce waves by simple surface injection of water from a reservoir.

The present invention contemplates the generation of translatory waves of the spilling breaker type and includes a surfing tank comprising a pool of lagoon area and a wave-producing portion or reservoir area. A pump receives water from the pool area and discharges it into the wave-producing portion at an average rate substantially equal to the rate of water flow from the latter to the former, raising the water level in the wave-producing portion above the normal quiescent level of the water within the pool. Then, a gate in the botom of the wave-producing portion is opened and, as the water within is lowered by the effect of gravity converting the potential energy to kinetic energy, a controlled quantity thereof is forceably expelled into the pool area at a distance below the normal quiescent level thereof. Substantially all of this expelled portion is deflected upwardly to create a translatory surface wave upon the body of water within the pool area. In contrast to the methods employed in the prior art, my apparatus produces waves by utilizing only the potential energy of the hydraulic head of the raised portion of water and a properly proportioned directional control, and utilizes a predetermined pumping rate related to the rate of water released to the pool area. My apparatus is comparatively simple, enjoys improved reliability and reproducibility, and reduced operating and maintenance costs.

The desired movement of water can be obtained by directing substantially all of the discharged water toward the surface of the body of water through an upwardly sloping discharge path, or preferably it can be obtained by directing substantially all of the discharged water in a horizontal direction against a baffle or deflector removed from the discharge gate and formed to direct substantially all of the discharged water toward the surface of the body of water. We turn now to a more detailed discussion of a preferred embodiment of this invention.

The improved surfing tank of the preferred embodiment of the invention includes a pool area floor having an upstream end and a downstream end. The floor slopes upwardly in the downstream direction to transcend into a beach which is approximately level with the normal ground surface or which extends above the quiescent level of the water in the pool or lagoon area. A pair of substantially vertical sidewalls extend longitudinally along either side of the pool floor. These sidewalls may also be sloped outwardly if desired. The wave-producing portion is formed adjacent the upstream and by rearward extensions of the sidewalls, a rear wall extending laterally between the sidewalls, and a substantially horizontal floor spaced above the downstream end of the pool floor. A vertical dividing wall extending between the sidewalls separates the wave-producing portion from the pool area. A horizontally elongate opening is defined along the bottom of the dividing wall. A quick-opening and quick-closing gate disposed within the opening communicates between the wave-producing portion and the pool area. In the embodiment chosen for illustration, a deflector traversing the width of the pool is spaced downstream of the gate at the junction of the horizontal floor and the pool floor. Hydraulic pumping means are provided to pump water from the pool area and deposit same at a raised elevation within the wave-producing portion. It may be noted here that reference to a "pool" may also include natural bodies of water, such as lakes, lagoons, etc., where it is desired to produce appropriate waves for surfing. The wave-making apparatus of the invention will operate to produce waves in such natural bodies of water but for optimum efficiency it may be desirable to install sidewalls in order to minize any wave dissipation.

The present invention may more readily be described by reference to the accompanying drawings, in which:

FIGURE 2 is an elevational view in fragmentary section taken along the line 2—2 of FIGURE 1 and illustrating the general operative nature thereof;

FIGURE 3 is a plan view in broken section taken along the line 3—3 of FIGURE 2 and specifically illustrating the water-return system;

Figure 1:
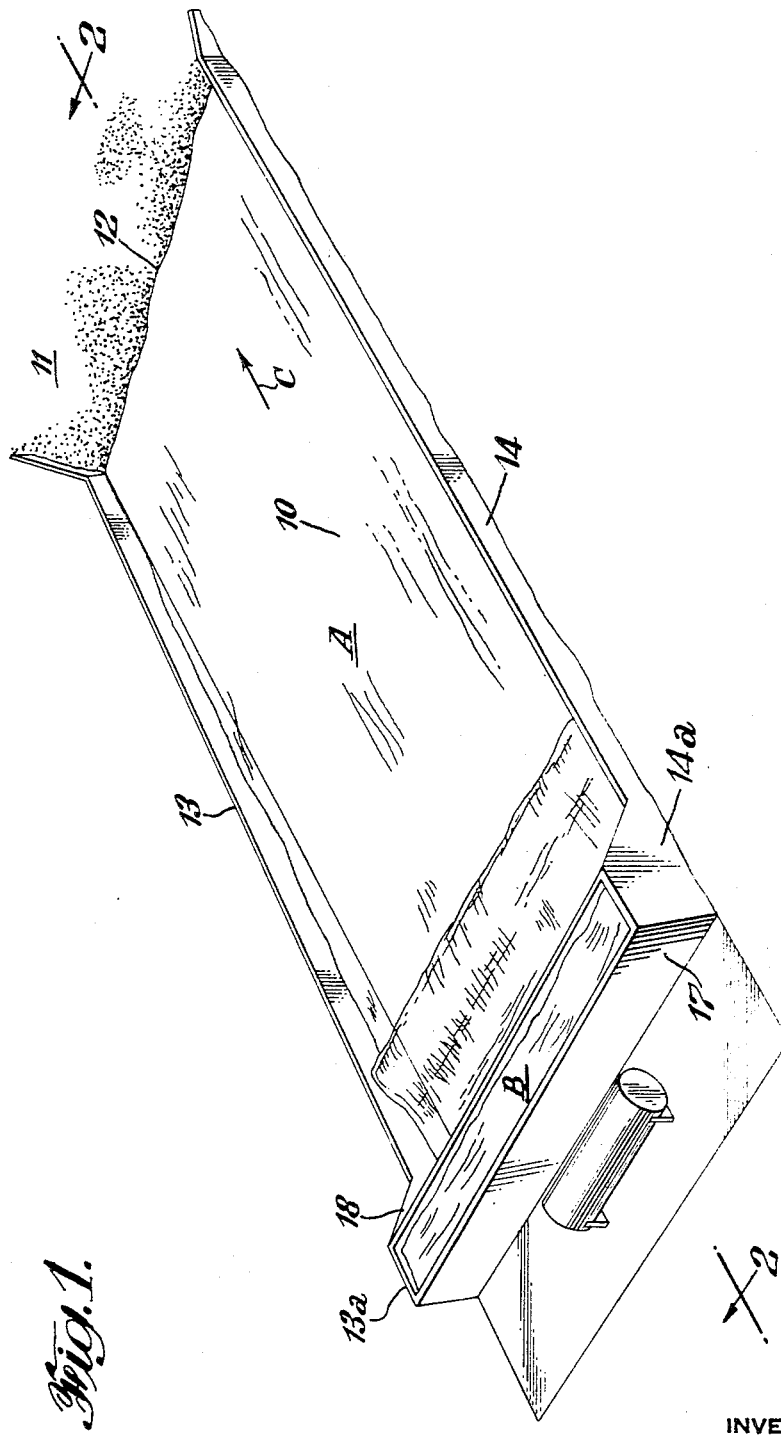
FIGURE 1 is a perspective view of a surfing tank embodying the principles of the present invention as it would appear during use.

Turning now to the drawings, the same reference numerals indicate corresponding elements throughout the several views. FIGURE 1 is a perspective view of a presently preferred surfing tank embodying the teachings of the present invention. The surfing tank comprises a pool rea, generally designated by the reference character A, and a wave-producing portion, generally designated by the reference character B. A floor 10 sloping upwardly in the downstream direction as indicated by the arrow C forms the bottom for the pool area A. A beach 11 simulating the natural ocean shore forms a continuation of the floor 10 beyond the downstream water line 12. A pair of sidewalls 13 and 14 extend vertically upward from the floor 10 and extend the longitudinal length thereof. Heightened sidewall extensions 13a and 14a integral with the sidewalls 13 and 14, respectively, extend beyond the upstream end of the floor 10. An upwardly, outwardly sloping rear wall 17 extends laterally between the terminal ends of the sidewall extensions 13a and 14a. A forward wall 18 extending between the sidewalls and spaced from the rear wall 17 forms a mutual division between the pool area A and the wave-producing portion B. The rear wall may be vertical as is shown, or may slope rearwardly or forwardly. The vertical angles of rear wall 17 and forward wall 18 are inconsequential. The only purpose of these walls 17 and 18 and sidewalls 13a and 14a is to provide means for storing or maintaining a head of water above the normal quiescent level of the body of water upon which surfing waves are to be formed.

Referring now to FIGURE 2, which further details a preferential construction of the surfing tank of FIGURE 1, a substantially horizontal floor 19, forming the bottom of the wave-producing portion B, extends forward of the wall 18 and terminates above the upstream end of the pool floor 10. A deflector 20 extending between the sidewalls 13 and 14 slopes upward from the floor 19 to a rounded apex, then slopes downward blending into the pool floor 10 to form an integral junction between the aforementioned floors. The specific shape of the deflector 20 is not critical as long as the front surface rises upward toward the surface of the water, the apex is rounded, and the rear surface slopes downward. Preferably, the deflector should rise in a smooth curve from the floor 19 and continue into a rounded top surface, but the specific curvature may vary, depending on the various parameters to be discussed more thoroughly herein, such as for example the location of the deflector. A water-permeable safety shield 21, preferably of screen or grating, extends vertically upward along the forward edge of the deflector 20. The vertical wall 18 terminates with a lower edge 22 approximately level with the rounded apex of the deflector 20 and spaced above the floor 19 to provide a water passageway communicating between the pool A and the wave-producing portion B. It should be understood that the rounded apex of the deflector may be higher or lower than the lower edge 22 of the vertical wall 18, depending on such considerations as, for example, the desired height of wave, the amount of water in the head and above the apex, and the slope of the front surface of the deflector. A vertical gate 23 operable to provide fluid communication between the water in the reservoir and the water in the pool area supported by spaced columns 24 is disposed between the lower edge 22 of the wall 18 and the floor 19. This gate is preferably risable as is shown, but it could also be operated in whole or in part in a lateral direction. A double-acting plunger, here shown as a fluid cylinder 27, provides means for rapid displacement of the gate between the open and closed positions. A fluid compressor 28 supported upon an apron 29 extending from the rear wall 17 communicates through the conduit 30, control junction 31 and fluid supply lines 32 and 32a to operatively control the fluid cylinder 27.

FIGURE 3 semi-schematically illustrates the water-return and pumping means employed in a preferred surfing tank. A series of conduits 33 extend through the sidewall 13 to abstract water from the pool area A into a collector manifold 34. A sump 35 receives water by gravity flow from the manifold 34. A hydraulic pump 37 draws water from the sump 35 and discharges through an exit conduit 38 through the upper edge of the rear wall extensions 13a into the wave-producing portion B. FIGURE 2 best illustrates the elevational relationship between the intake conduit 33 and the exhaust conduit 38. The rate of water removal from the pool area is adjusted to substantially equal the average rate of water release into the pool area. It is particularly noted that conduits 33 are positioned remote from the wave-producing area and preferably are as near to the downstream or beach area as is feasible in order to prevent the formation of echo or rebound waves from the shore which would interfere with the creation and operation of the desired surfing waves.

Figure 4:
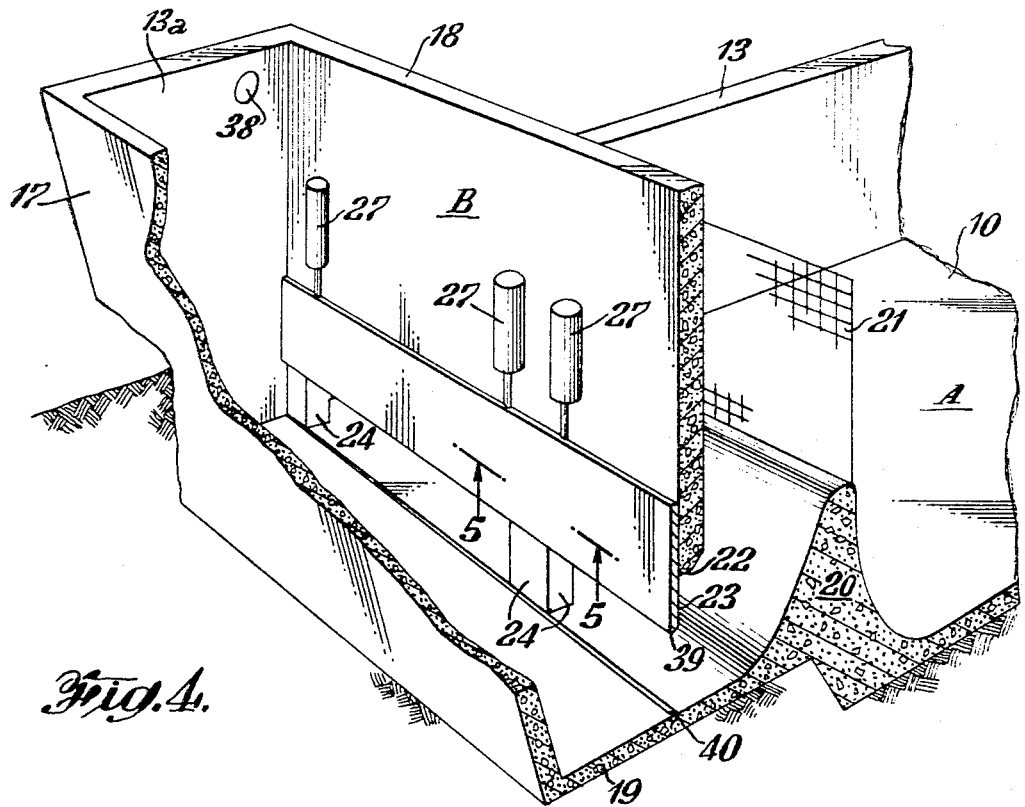
FIGURE 4 is a partial perspective view of the wave-generating portion of the device of FIGURE 1.

Attention is now directed to FIGURE 4 which particularly depicts the wave-producing portion B of the improved surfing tank constructed in accordance with the teachings of the present invention. Particularly noted is the lower beveled edge 39 of the gate 23. A meeting beveled edge 39 when the gate is in the lowered position to form a substantially water-tight seal. In the embodiment herein illustrated, the gate 23 comprises a series of interlocking sections, each section being guided by two supports 24 and operated by two fluid cylinders 27. As will be readily understood by those skilled in the art, the series of fluid cylinders 27 operate simultaneously allowing the segments to function as a single gate 23. This configuration facilitates installation of the gate 23 and permits the use of compact, reduced capacity fluid cylinders 27.

Figure 5:
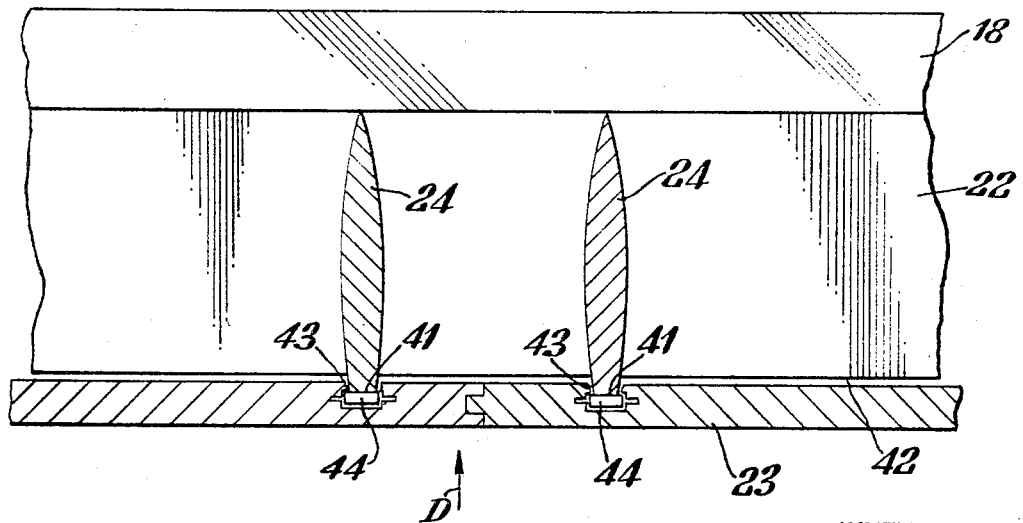
FIGURE 5 is an elevational view taken along the line 5—5 of FIGURE 4.

Turning now to FIGURE 5, the vertical guide mechanism of the gate 23 is particularly detailed. The supports 24 are constructed in optimum hydrofoil cross-section to induce minimal turbulence into the water passing through the conduit between the lower edge 22 of the wall 18 and the floor 19. The rearward edge 41 of the support 24 extends slightly beyond the rearward edge 42 of the vertical wall 18. Slots 43 vertically disposed within the gate 23 receive the rearward projection 41 of the supports 24. A series of rollers 44 spaced vertically along the rearward edge of the slots 43 are pivotally mounted within the gate 23 and abut the rear edge 41 of the supports 24. Water pressure in the direction of the arrow D maintains the gate 23 in its proper operative relationship against the supports 24.

Figure 6:
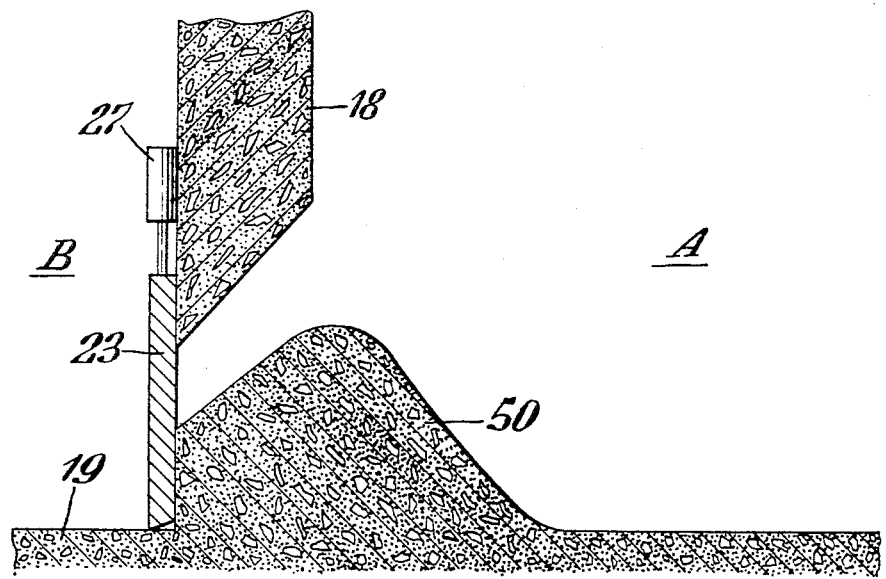
FIGURE 6 is a side view in cross-section showing the sloping discharge path when no separate deflector is used.
Figure 7:
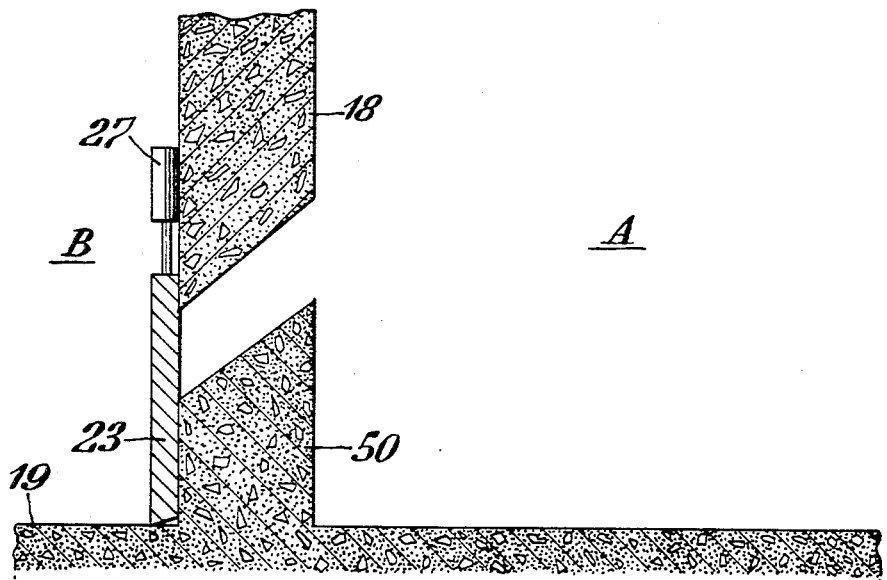
FIGURE 7 is a side view cross-section showing another embodiment of the sloping discharge path when no separate deflector is used.

In FIGURES 6 and 7 the front wall 18 is shown with a lower section designated by 50. The quick-opening gate is shown at 23, operable by the cylinder 27. In these embodiments of the invention showing the discharge path, the thickness of the wall 18 may be increased in order to provide adequate surface of the sloping discharge path to effect the upward direction of the water upon discharge.

In operation, the gate 23 is first lowered to form a substantial seal between the poll area A and the wave-producing portion B. The pool area A is first filled with water commensurate with the beach so that the ambient or quiescent level is above the conduits 33. The wave-producing portion is filled with water to its desired height. With the surfing tank thus prepared, the fluid cylinders 27 are activated, raising the gate 23. As the gate rises, the hydraulic head of the stored water within the wave-producing portion forces a quantity of water from the lower level thereof through the passageway between the wall 18 and the floor 19. As this quantity of water forceably strikes the deflector 20, a wave (illustrated as E in FIGURE 2) is created which travels downstream within the pool area and onto the beach 11. Water flows by gravity from the pool through the conduits 33 and the manifold 34 into the sump 35. Pump 37 raises the water through the discharge conduit 38 and again fills the wave-producing portion B. It will be readily understood by those skilled in the art that the height of water and the size and duration of the opening of the gate 23 directly controls the quantity of water ejected from the wave-producing portion.

It has been determined by the present inventor that the formation of solitary waves of translation of the spilling breaker type suitable for surfing is dependent on the following factors:

(1) The pressure difference between the height of the water in the retained head of the reservoir and the height of water in the surfing area (pool or lagoon area);

(2) The interval of time through which the pressure difference operates to discharge water from the reservoir and the amount of water flowing during that interval of time;

(3) The amount of vertical rise of the front upward sloping face of the deflector with respect to the horizontal distance of the apex of the deflector from the point of release of water from the reservoir;

(4) The slope of the bottom of the body of water with respect to the frictional value of the material comprising the bottom;

(5) The relationship, for a given shape of the front and read sloping surfaces of the deflector, between the height of water in the reservoir and the height of water in the lagoon area above the apex of the deflector.

With regard to these factors it is clear that according to the present invention the pressure of water discharged from the reservoir is a function of the hydraulic head in the reservoir which varies proportionally with the height of the column of retained water.

The interval of time through which the pressure difference operates to discharge water and the amount of water flowing during that interval of time are related so that the longer the discharge means operates the more water is discharged.

The size of the gate opening through which water will be discharged from a predetermined height and for a predetermined time is also equally relevant.

The amount of vertical rise of the front upward sloping face of the deflector with respect to the horizontal distance of the apex of the deflector from the point of release of water from the reservoir are interrelated so that the vertical rise or height of the apex increases as the horizontal distance of the apex increases from the point of discharge.

The slope of the body of the pool or lagoon area is important in the formation of translatory waves suitable for surfing according to the present invention. If there is no slope to the bottom any wave which would be formed would revert to a swell and would not break to form the desired translatory wave suitable for surfing. The frictional value of the material comprising the bottom will effect the slope necessary. The frictional value of a material may be defined as the resistance to relative motion between the material in contact with another material. The frictional value of a material increases as the roughness of the material increases and decreases as the material becomes increasingly smooth. As the slope of the bottom increases the frictional value may decrease without losing the desired wave formation and conversely as the slope of the bottom decreases the frictional value may be increased.

The amount of water in the reservoir with respect to the amount of water above the apex of the deflector is important in the practice of the invention. The height of water in the reservoir should be increased as the height of water above the apex is increased.

In a particular instance, I have determined that a wave suitable for surfing purposes may be generated by constructing a pool such that the normal quiescent level of water within the pool area is two to three feet above the apex of the deflector and the reservoir or wave-producing portion accommodates a water column extending twenty to twenty-five feet above the floor. The deflector used herewith begins its inclination immediately in front of the gate to a height of three feet. Using the water column height and deflector combination as described above, a wave of approximately five feet high (reference character H of FIGURE 2) is generated approximately sixteen feet (reference character L of FIGURE 2) from the wall 18. Numerous wave formations may be created with minor variations of parameters, in accordance with the invention. For example a shorter water column and subsequently reduced hydraulic head would tend to produce a long rolling type of wave. Similarly, a considerably shortened higher wave could be attained if the hydraulic head were held substantially high and the inclination of the deflector was increased.

Studies have been conducted wherein the above-mentioned parameters have been varied. Apparatus has been constructed in accordance with the invention, wherein the height of the deflector at its apex was three feet, the distance from the gate was three feet, the height of water above the apex was three feet and the height of water in the reservoir above the quiescent level of the water in the pool area was sixteen feet. When this apparatus was operated excessive turbulence was observed. When the above values were varied in order to three feet, twelve feet, three feet and sixteen feet swelling occurred. In each of the above two instances conditions suitable for surfing were not obtained. When the above values were changed in order to three feet, nine feet, three feet and sixteen feet, i.e., so that the deflector was located at a distance nine feet from the gate, very little turbulence resulted and a solitary wave of translation of the spilling breaker type, suitable for surfing was created. In Table I additional test data is tabulated in order to further demonstrate the invention.

and provides very definite advantages with respect to overall cost and maintenance operations. The energy requirements consist of the pump energy required to pump the water from the pool area or from an overflow basin, back into the wave generation reservoir and the mechanical energy necessary to open and close the discharge means. The instant device generates surfing waves in the immediate vicinity of the reservoir or wave-making area with an attendant flow of water which is recirculated. The generation of translatory waves may be accurately controlled so that a solitary wave suitable for surfing is produced at any desired interval thereby offering maximum utilization of the concept of creating surfing conditions artifically. The amplitude of the wave generated is also variably controlled according to the selection of parameters discussed herewith. Since under normal circumstances there is a tendency for a given body of water to become contaminated with pollutants, the recirculation of water provided for in the present invention represents an important aspect and an additional advantage. The flow of water associated with the action of translatory waves and especially those waves which break makes it possible to carry any pollutants into outlets provided downstream. The particular advantage of this aspect of the invention is twofold in that not only is there an inherent anti-pollution control built into the system but the removal of water reduces any tendency for the formation of shore echo waves or interfering swells or flow patterns which would adversely affect the translatory wave, TABLE I.—BAFFLE A-1
Approx. Gate Opening Speed=150′ min.
Dist. from Gate to Apex=9′
Apex Height=3′

| Legend | Reservoir Depth (A) | Water Depth Over Apex (B) | Hydraulic Head (C) | Lagoon Depth (D) | Wave Formation Quality Description |
|---|---|---|---|---|---|
| | 15′ | 2′ | 10′ | 8′ | SWELL |
| | 17′ | 2′ | 12′ | 8′ | ↑ |
| | 19′ | 2′ | 14′ | 8′ | IDEAL RANGE |
| | 21′ | 2′ | 16′ | 8′ | |
| | 23′ | 2′ | 18′ | 8′ | ↓ |
| | 25′ | 2′ | 20′ | 8′ | EXPLOSION |
| | 19′ | 3′ | 13′ | 9′ | SWELL |
| | 21′ | 3′ | 15′ | 9′ | ↑ |
| | 23′ | 3′ | 17′ | 9′ | IDEAL RANGE |
| | 25′ | 3′ | 19′ | 9′ | |
| | 27′ | 3′ | 21′ | 9′ | ↓ |
| | 29′ | 3′ | 23′ | 9′ | EXPLOSION |
| | 22′ | 4′ | 15′ | 10′ | SWELL |
| | 24′ | 4′ | 17′ | 10′ | |
| | 26′ | 4′ | 19′ | 10′ | |
| | 28′ | 4′ | 21′ | 10′ | ↓ |
| | 30′ | 4′ | 23′ | 10′ | IDEAL RANGE |

From the foregoing discussion and test data it is clear that the present invention contemplates varying the parameters set forth herein so that one may produce translatory waves of the spilling breaker type suitable for surfing, according to any desired program of wave frequency and amplitude.

The wave-generating apparatus of the present invention is unique in the art and offers very definite improvements over other devices which heretofore have not been concerned with the production of waves which are suitable for surfing. The present device is a hydraulic pressure type apparatus which is extremely simple in construction and tend to set up oscillation of the entire body of water in the pool area.

The water flowing through the gate and impinging upon the deflector produces a translatory wave traveling downstream of the pool area. The movement of the translatory wave in combination with the effect of the sloping floor produces a translatory wave of the spilling breaker type which is most suited for surfing. Upon re-opening the gate for the production of the next wave, it is interesting to note that if the water added to the pool by the previous wave has been substantially removed, the subsequent wave will be in deteriorated form and may not be of the spilling breaker type. Indeed, if the rate of water removal from the pool area does not approximate the rate of water addition subsequent waves deteriorate to the extent that they become mere swells totally unsuited for surfing. This phenomena seems to obtain even if the head provided by the wave-producing portion is maintained substantially constant. While this phenomena is not clearly understood, it would appear that the continuous removal of water from the pool area as the wave traverses the pool minimizes the tendency to produce reflecting waves and the production of oscillatory waves to thereby enhance subsequent production of translatory waves of the spilling breaker type. Also, ideally the removal of water should be as far from the wave-producing area and as near to the shore area against which the wave dies as is feasible. However water may be removed at any area or at various areas between the wave-producing area and the shore or extreme downstream area.

Various changes and modifications in the device chosen for purposes of illustration in the drawings will readily occur to persons skilled in the art having regard for the disclosure thereof. In the presently preferred embodiment of the invention as illustrated, the gate actuating means is particularly illustrated as a pneumatic cylinder. With minor modification, the gate could be actuated effectively with a hydraulic cylinder, an electromechanical plunger, or a rack and pinion mechanism. In the same manner, the waveproducing portion could be constructed remote of the pool area and a conduit employed for water communication therebetween. Further, the gate could be constructed for lateral displacement as opposed to vertical displacement or by rotating small sections of the gate to create a diagonally advancing wave. Diagonally advancing waves may be conveniently produced by using any type of gate which is divided into sections and operating each section sequentially to give the desired effect.

Having described my invention what I claim as new and desire to secure by Letters Patent is:

1. A surfing tank, adapted to contain a hydraulic head of stored water and further adapted to create a translatory wave of the spilling breaker type upon the surface of the water in the pool area, said tank comprising:
    (a) a pool area including a floor sloping upward in the downstream direction, a pair of sidewalls, and an upstream end wall;
    (b) a wave-producing portion defined by a front wall, a rear wall spaced a predetermined distance behind said front wall, and sidewalls, and a substantially horizontal floor;
    (c) means defining a passageway in said upstream end wall;
    (d) means defining a passageway in said front wall;
    (e) a quick-opening and quick-closing gate disposed in said passageway for discharging successive quantities of said stored water in the downstream direction from beneath said surface of water into the pool area;
    (f) means for rapid displacement of said gate between the open and closed positions;
    (g) a deflector having on its upstream side a front upward sloping surface disposed in the path of water escaping through said passageway from said wave-producing portion to said pool area, when the gate is in the open position, said deflector extending upward from the floor of said wave-producing portion to a rounded apex and having a rear surface sloping downward to the pool area floor and toward the downstream part of the pool area.

2. A surfing tank according to claim 1 wherein the floor of said wave-producing portion is disposed above the upstream end of the floor of said pool area.

3. A surfing tank according to claim 1 wherein said upstream end wall and said front wall are contiguous and are formed by a single wall.

4. A surfing tank according to claim 1 which additionally includes means for removing water from said pool area at a rate substantially equal to the average rate of water added to said pool area through said passageway.

5. A surfing tank according to claim 4 wherein said front wall of said wave-producing portion terminates with a lower edge approximately level with said rounded apex of the deflector and above said horizontal floor, so that substantially all of said body of water is directed diagonally upwardly toward said surface of water in the pool area.

6. A surfing tank according to claim 4 wherein said water removing means is located in the downstream part of the pool area and substantially remote from the wave-producing portion of said tank.

7. A surfing tank according to claim 1 wherein the quick-opening gate comprises a series of interlocking sections, each section being guided by supports connected to each end of said section, said gate being operated by a plurality of hydraulic cylinders connected to said gate.

8. A surfing tank according to claim 7 wherein said gate is provided with slots to receive the rearward projection of said supports and a series of rollers are spaced vertically along the rearward edge of said slots, said rollers being pivotally mounted within said gate and abutting the rear edge of said supports.

9. Apparatus for creating waves, on the surface of a body of water, suitable for surfing comprising means for maintaining a hydraulic head of stored water above said surface of said body of water and separate therefrom, means for intermittently releasing a controllable amount of said stored water into said body of water from beneath the surface of said body of water, means for deflecting said controllable amount of water diagonally upward toward said surface of said body of water and means for removing water from said body of water at a rate substantially equal to the average rate of addition of water from said hydraulic head of stored water.

10. Apparatus according to claim 9 wherein said means for removing water is disposed in the downstream area substantially remote from said discharge means.

11. In a surfing tank, adapted to contain a body of water and further adapted to create a wave upon the surface of the water, said tank including:
    a pool area including a floor sloping upwardly in the downstream direction, a pair of sidewalls, and an upstream end wall; and a wave-producing portion defined by a front wall, a rear wall spaced from said front wall, extensions of said sidewalls, and a substantially horizontal floor; the improvements therein comprising:
    (a) means defining a horizontally elongate opening extending laterally in the nethermost position of said upstream end wall and said front wall:
    (b) a conduit communicating between the opening in said end wall and front wall;
    (c) a quick opening and quick closing gate disposed in said conduit;
    (d) means for rapid displacement of said gate between the open and closed positions; and
    (e) a quasi-parabolic deflector traversing the width the said floor spaced downstream of said upstream end wall.

12. The improved surfing tank of claim 11 wherein said upstream end wall and said front wall are mutually conjunctive.

13. The improved surfing tank of claim 11, wherein said rear wall extends upwardly divergent from said front wall.

14. The improved surfing tank of claim 11, wherein the floor of said wave-producing portion is spaced above the upstream end of the floor of said pool area and wherein the deflector extends parabolically upward from the first said floor to a rounded apex and then slopes hyperbolically downward to the second said floor.

15. Apparatus for creating waves on the surface of a body of water, said body of water being disposed over a bottom surface sloping upwardly in the downstream area, comprising:
  (a) reservoir means comprising means for maintaining a hydraulic head of stored water above said surface of said body of water and separate therefrom, said reservoir means being comprised of a front wall, two sidewalls, a rear wall, a floor wall, and means defining a passageway in said front wall;
  (b) discharge means positioned in said reservoir means and operable to provide fluid communication between said stored water and said body of water, at a level below the ambient normal quiescent level of said body of water, for successively releasing a controllable amount of said stored water in the downstream direction into said body of water; and
  (c) a deflector comprising a front upwardly sloping surface positioned sufficiently close to the point of release of said amount of stored water to effectively direct said amount of water upwardly, a rounded apex, and a rear surface sloping downwardly in the downstream direction.

16. Apparatus according to claim 15 wherein said discharge means comprises a quick-opening and quick-closing gate.

17. Apparatus according to claim 15 wherein said deflector is disposed so that substantially all of said quantity of stored water is directed upwardly toward said surface of said body of water.

18. Apparatus according to claim 15 wherein said front upwardly sloping surface of said deflector extends from the point of discharge of said quantity of stored water.

19. Apparatus according to claim 15 which additionally comprises means for removing water from said body of water at a rate substantially equal to the average rate of water added through said passageway.

20. Apparatus according to claim 19 wherein said means for removing water is located in the downstream part of said body of water and substantially remote from said discharge means.

21. A method for producing translatory waves of the spilling breaker type, suitable for surfing, in a body of water, said body of water having an upstream and a downstream area and being disposed over a bottom surface sloping upward toward the downstream area comprising the steps of:
  (1) storing water in a reservoir at a predetermined level above the ambient normal quiescent level of the water in said body of water to provide a hydraulic head of stored water, said reservoir being separate from said body of water and comprising discharge means for releasing a controllable amount of said stored water from the reservoir to said body of water;
  (2) successively opening and closing said discharge means for intermittent release of a controllable amount of said stored water under the pressure of said hydraulic head, into said body of water, from beneath the surface of said body of water;
  (3) directing each controllable amount of said released water against a deflector so that the released water flow diagonally upward toward the surface of said body of water to form a translatory wave and a movement of water in the downstream direction, said water flowing over said bottom sloping surface.

22. The method according to claim 21 wherein said body of water is enclosed in a surfing tank having two sidewalls, a front wall located in the upstream area and a beach area located in the downstream area.

23. The method of claim 21 wherein substantially all of the water released is directed upwardly toward the surface of said body of water.

24. The method of claim 21 which additionally comprises the step of removing water from the said body of water at a rate substantially equal to the average rate of addition of water from the reservoir.

25. The method of claim 21 wherein the water is removed from said body of water in the downstream area substantially remote from the area in which said stored water is released from below the surface of said body of water.

26. The method according to claim 21 wherein the floor of said reservoir is disposed at a height above the floor of said body of water.

27. Apparatus for creating waves on a surface of a body of water suitable for surfing comprising reservoir means for maintaining a hydraulic head of stored water above said surface of said body of water, means for intermittently discharging a quantity of said stored water from beneath said surface of said body of water, and means for directing substantially all of said quantity of stored water diagonally upward in one direction toward the surface of the body of water.

28. Apparatus according to claim 27 wherein the means for intermittently discharging said quantity of stored water is a quick-opening and quick-closing gate.

29. Apparatus according to claim 27 wherein said reservoir means comprises a front wall, a rear wall and sidewalls, and wherein said means for directing said quantity of stored water is disposed in said front wall, said front wall having an upper section and a lower section and means defining a passageway in said front wall wherein the uppermost part of the lower section is at least substantially equal in height to the lowermost part of the upper section above the bottom of the reservoir means.

30. A method of creating waves on the surface of a body of water suitable for surfing comprising maintaining a hydraulic head of stored water above said surface of the body of water and intermittently discharging a quantity of said stored water from beneath said surface of the body of water wherein substantially all of said quantity of stored water is directed diagonally upward in one direction toward said surface of the body of water.

References Cited

UNITED STATES PATENTS

| | | | |
|---|---|---|---|
| 586,718 | 7/1897 | Wharton | 4—172 |
| 586,983 | 7/1897 | Wharton | 4—172 |
| 2,056,855 | 10/1936 | Hertz | 4—172 |
| 2,072,930 | 3/1937 | Voorduin | 61—19 |
| 2,101,234 | 12/1937 | Becher | 61—28 X |
| 2,103,600 | 12/1937 | Stevens | 61—18 |
| 3,005,207 | 10/1961 | Matrai | 4—172 |
| 3,070,963 | 1/1963 | Dubouchet | 61—28 X |
| 3,350,724 | 12/1967 | Leigh | 4—178 X |

FOREIGN PATENTS

| | | |
|---|---|---|
| 291,580 | 4/1916 | Germany. |
| 507,353 | 12/1951 | Belgium. |

EARL J. WITMER, Primary Examiner

U.S. Cl. X.R.

4—171, 172; 61—18, 19, 28